UNITED STATES PATENT OFFICE.

HENRI N. F. SCHAEFFER, OF MANCHESTER, NEW HAMPSHIRE.

PROCESS OF DYEING MIXED GOODS.

SPECIFICATION forming part of Reissued Letters Patent No. 11,647, dated February 1, 1898.

Original No. 592,022, dated October 19, 1897. Application for reissue filed December 29, 1897. Serial No. 664,133.

*To all whom it may concern:*

Be it known that I, HENRI N. F. SCHAEFFER, a citizen of France, residing in Manchester, in the county of Hillsborough and State of New Hampshire, have invented an Improvement in Methods of Dyeing Mixed Goods, of which the following is a specification.

This invention relates to a process for dyeing mixed goods composed of animal and vegetable fibers, and is especially advantageous for dyeing mixed goods a fast black on both fibers, whereby the mixed goods are dyed a deep, rich, and superior black, fast to light and perspiration, without injury to the fibers—that is, without tendering the cotton and without impairing the gloss and elasticity of the wool.

In accordance with this invention the wool fiber of the mixed goods is dyed after the manner now commonly practiced in wool-dyeing by immersing the goods in a vat or kettle containing the dyeing solution, and after boiling a predetermined length of time the dyed goods are removed, washed well, and preferably dried.

The cotton fiber is unaffected during the dyeing of the wool and is dyed, in accordance with this invention, by padding the partially-dyed goods with an anilin-black mixture or liquor, preferably of a composition as will be described, and when padded with the anilin-black liquor the goods are dried, and the anilin-black is then developed in an anilin-ager and washed. During the process of dyeing the cotton with the anilin-black the color of the wool is not affected and, further, the wool fiber is not injured—that is, its elasticity and gloss or luster are not impaired, and so also the cotton fiber is not tendered during the two operations.

In order that my invention may be more clearly comprehended, I will give more in detail my improved process for dyeing mixed goods a fast black and will enumerate one set of chemicals and proportions with which I have secured excellent results, although I do not wish to be understood as confining my invention to the particular chemicals and proportions set forth.

For five pieces of mixed goods, each fifty yards long and thirty-six inches wide, I employ for the wool-dyeing a bath made up as follows: To a quantity of water usually employed for dyeing the amount of cloth specified, about one hundred to one hundred and fifty gallons, which is placed in a dyeing vat or kettle of usual construction, I add one pound twelve ounces of so-called "alizarin-black," fifteen pounds of bisulfate of soda, and one pint of lactic acid. The mixed goods to the amount above specified are immersed in the dye-bath after the latter has reached the temperature of from 60° to 70° Fahrenheit. The goods are subjected to a gradually-increasing temperature for about forty-five minutes, at the end of which time the bath is raised to the boiling-point and maintained at the boiling-point for the further time of about forty-five minutes, during which time the wool fiber is thoroughly dyed a deep black, fast to light and perspiration. The goods are then removed, washed well, and preferably dried. During the dyeing of the wool the cotton fiber is not dyed, but may be stained. To dye the cotton fiber of the partially-dyed mixed goods, I employ an anilin-black mixture or liquor, preferably made up of two parts, as follows: Boil eighteen pounds of corn-starch in twenty-two gallons of water, and add a solution of forty-eight pounds of yellow prussiate of potash and twenty-two pounds of sodium chlorate in twenty-three gallons of cold water. This constitutes part No. 1 of the anilin liquor. Part No. 2 is made by dissolving one hundred and sixty pounds anilin salt (hydrochlorate) in eight gallons of hot water, to which are added twenty-four gallons of cold water.

Take twenty-eight gallons of part No. 1 and add ten gallons of part No. 2, which forms an anilin-black padding liquor suitable for the quantity of goods above mentioned.

The anilin-black liquor is placed in the box of a foularding or padding machine containing a roller which is below the level of the liquor and a set of squeezing-rolls preferably covered with rubber and located above the liquor. The partially-dyed mixed goods are then run through the anilin liquor, passing under the roller and between the squeezing-rolls, and the goods on their passage through the box to the squeezing-rolls are padded with the anilin liquor, and the surplus liquor is squeezed out by the said rolls. The goods padded with the anilin-black liquor are then dried, which may be effected by passing them over hot drying-cans or through a hot flue of any suitable or usual construction. After the goods padded with the anilin-black liquor have been dried they are run through an anilin-ager, where they are subjected to the action of steam, preferably from two and one-half to three and one-half minutes, to oxidize the anilin-black and develop it in the cotton fiber of the mixed goods. The length of time the goods are allowed to remain in the ager varies and depends on the composition of the anilin-black liquor, its concentration, and also the condition of the steam. Superior results are obtained by keeping the temperature of the steam near 220° to 225° Fahrenheit.

After the goods have been aged they are run through an open washing-machine the first box of which contains a solution of bichromate of potash or soda, and one or two ounces per gallon of water, preferably heated at 140° to 150° Fahrenheit, and then washed, soaped, washed in warm water, and dried.

Regular and superior results are insured by keeping the anilin padding liquor at a constant low temperature, preferably about 40° to 50° Fahrenheit.

Mixed goods dyed black as above described are characterized by the fastness of the black, both in the wool and in the cotton, to light, heat, and perspiration, and also by the depth and bloom of the shade of the color and the non-impairing of the gloss and feel of the wool and the strength of the cotton fiber. The black of the wool is not affected by the development of the black on the cotton and retains its original luster, while the cotton fiber, on the other hand, is not injuriously affected during the wool-dyeing.

By the process of dyeing mixed goods herein described I am enabled to increase the production in a given time and obtain a uniform color or dyeing effect on all the goods—that is, the variation in the shade of the black between different lots of dyed goods is reduced to a minimum.

I have herein described the method of dyeing a fast black on mixed goods, but my improved process is equally well adapted for producing so-called "cross-dyed" effects by dyeing the wool or animal fiber with any desired color other than black and then dyeing the cotton fiber with the anilin-black, substantially as above set forth.

I have described the cotton as being saturated or impregnated by running it through the padding liquor, first passing under the roller in the box of the foularding machine; but I do not desire to limit myself to this particular manner of padding the cotton, as it may be passed directly between the squeezing-rollers and the lower roller may run in the padding liquor and act as a carrier for the liquor to the cloth.

I claim—

1. The process of dyeing mixed goods composed of animal and vegetable fibers, which consists in dyeing the animal fiber of the goods in a vat or vessel containing a dyeing solution which dyes the animal fiber only, washing the goods so dyed, and then saturating or impregnating the whole of the partially-dyed goods with an anilin-black liquor and subsequently developing the anilin-black on the vegetable fiber of the mixed goods, substantially as described.

2. The process of dyeing mixed goods, composed of animal and vegetable fibers, which consists in dyeing the animal fiber of the goods in a vat or vessel containing a black dyeing solution which dyes only the animal fiber and which is unaffected by the anilin-black, washing and then padding the partially-dyed goods with an anilin-black liquor, and subsequently developing the anilin-black on the vegetable fiber of the mixed goods, substantially as described.

3. The process of dyeing mixed goods composed of wool and cotton a fast black, which consists in dyeing the wool fiber with a black dye which dyes the wool only and which is unaffected by anilin-black, and dyeing the cotton by padding the goods with an anilin-black liquor, and developing the black in the cotton after it has been padded, substantially as described.

HENRI N. F. SCHAEFFER.

Witnesses:
JAS. H. CHURCHILL,
J. MURPHY.